(12) United States Patent
Benjey

(10) Patent No.: US 6,371,146 B1
(45) Date of Patent: Apr. 16, 2002

(54) PEELAWAY TYPE ROLLOVER VALVE ELEMENT

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/707,480

(22) Filed: Nov. 7, 2000

(51) Int. Cl.[7] .............................................. F16K 24/04
(52) U.S. Cl. ........................................... 137/2; 137/202
(58) Field of Search ............................. 137/2, 43, 202

(56) References Cited

U.S. PATENT DOCUMENTS

| | | | |
|---|---|---|---|
| 4,753,262 A | 6/1988 | Bergsma | 137/39 |
| 4,770,201 A | 9/1988 | Zakai | 137/202 |
| 4,982,757 A * | 1/1991 | Ohasi et al. | 137/202 |
| 5,172,714 A * | 12/1992 | Kobayashi et al. | 137/202 X |
| 5,313,977 A | 5/1994 | Bergsma et al. | 137/43 |

FOREIGN PATENT DOCUMENTS

EP 0 724 098 A1 7/1996

* cited by examiner

Primary Examiner—Gerald A. Michalsky
(74) Attorney, Agent, or Firm—Roger A J Johnston

(57) ABSTRACT

An improved fuel level responsive peelaway action valve for vehicle fuel tanks, in which a float moves a valve closure element into sealing contact with a vapor venting outlet, and then pulls or "peels" the valve element off the vapor venting outlet when fuel level drops. The valve closure element comprises a thin, flexible sealing portion for engaging the vapor venting outlet with low sealing forces, and a stiffened marginal portion acted on by a rigid cage or frame which is connected to the float. As the float drops, the cage contacts the stiffened marginal portion and levers the valve element off the venting outlet.

14 Claims, 3 Drawing Sheets

PEELAWAY TYPE ROLLOVER VALVE ELEMENT

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention is in the field of fuel level responsive valves used in vehicle fuel tanks.

Fuel level responsive valves are well known in the art of controlling the venting of fuel vapor from vehicle fuel tanks. These valves typically have a float mechanism trapped within a valve body to move a valve closure element into and out of sealing engagement with a vent outlet in response to rising and falling fuel levels. Such valves are most often employed as rollover valves, responding to fuel slosh or vehicle tilt and rollover situations to protect a vapor-processing canister from liquid fuel, although they can also be used for fill control shutoff and primary onboard vapor control.

Some successful float-operated valves are shown in U.S. Pat. No. 4,753,262 issued to Bergsma, and U.S. Pat. No. 5,313,977 issued to Bergsma, et al., both co-owned with the present application. These valves employ a peelaway type opening action, in which a rigid plastic plate- or paddle-like valve element is initially "cracked" open over a limited segment of its sealing surface with the vent outlet by an actuator attached to the float, and subsequently "peeled" from the vent outlet, either circumferentially or in lever fashion. By initially cracking or peeling only a portion of the valve element from the vent outlet, the pressure differential acting across the valve element is reduced to prevent the float from becoming "hung up", or lodged in the closed position, unable to overcome the force of the pressure differential acting across the surface area of the valve element to open the valve when fuel level drops. The net downward force comprising the weight of the float, less buoyancy forces is not sufficient to move the entire valve element off the vent outlet at once, because the accumulated force of the vapor pressure differential acting across the entire surface area of the valve element is substantially greater.

Heretofore rigid valve elements have been employed because they are more responsive to the initial "cracking" or "peeling" action of the float. It is therefore necessary to either machine the sealing surfaces of the rigid valve element and the vent outlet carefully to ensure an adequate vapor and liquid seal, or to apply an additional resilient, rubberlike seal member to either the valve element or the vent outlet to improve the seal between them.

Another prior approach has been the use of pliable, ribbonlike valve elements which are opened in a generally continuous peeling fashion. Examples of such valves are shown in the above-described patent to Bergsma, et al. and in U.S. Pat. No. 4,770,201 and published European Patent Application EP 0724098A1 to Zakai, et al.

While pliable, rubber-type valve elements provide improved sealing with the vent outlet, rubber-type seals have tended to provide a continuous peeling action which has been found not as desirable as the cracked-open lever action of rigid valve elements. Such seals have also been found prone to "bunching up" or deforming due to high volume vapor flow, large pressure differentials, and any horizontal sliding motion of the float relative to the vent outlet.

BRIEF SUMMARY OF THE INVENTION

The present invention solves the foregoing disadvantages of the prior art valve with a valve element having a pliable, resilient diaphragm-like seal member peripherally stiffened by a thickened rim to give the resilient seal a lever-type opening action.

In a preferred form, the float has a generally ring-shaped cage or frame which traps the resilient seal member. The trapped resilient seal is preferably stiffened, for example with a thickened edge to provide body or shape holding characteristics to a thin, pliable center section which engages the vent outlet.

The seal member is trapped inside the cage for limited vertical, and preferable also limited horizontal movement within the cage to assist with the opening action.

In the preferred form the cage is integrally formed with the float and has a flexible strip portion or "living hinge" portion which is folded and snap-locked in place after insertion of the seal member in the cage for retaining the seal member in the cage.

DETAILED DESCRIPTION OF THE INVENTION

Figure 1:
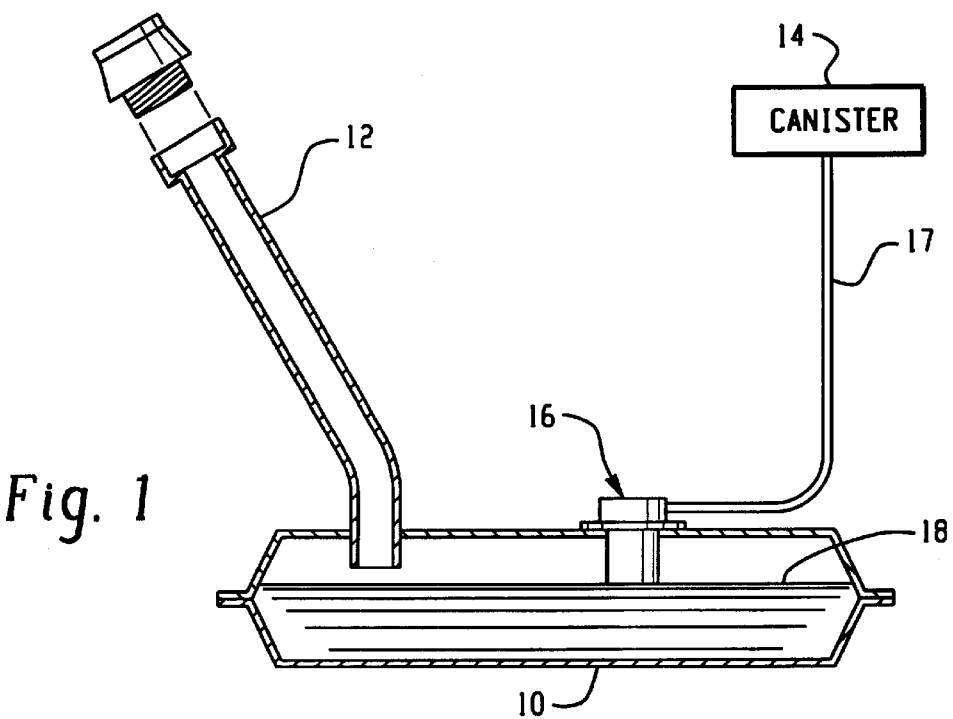
FIG. 1 is a schematic representation of a vehicle fuel system of the type in which a valve according to the present invention is capable of being used.

Referring first to FIG. 1, a valve indicated generally at 16 according to the present invention is shown schematically illustrated in a typical vehicle fuel system environment including a fuel tank 10, a filler pipe 12, and a vapor recovery apparatus such as a carbon canister 14 connected to valve 16 by a conduit or hose 17.

Fuel level responsive vapor control valves such as 16 are typically mounted in the upper wall of fuel tank 10, positioned to close vapor venting from the tank to canister 14 when fuel level 18 submerges valve 16, for example during refueling, or during fuel slosh or vehicle rollover conditions. Valve 16 reopens when fuel level 18 drops, or when the slosh or rollover condition is alleviated.

In the illustrated embodiment, valve 16 is depicted as a "rollover" valve typically used in conjunction with one or more additional valves in the fuel tank to supplement refueling vapor control and pressure relief functions. It will be apparent to those skilled in the art, however, that valve 16 incorporating the present invention can be employed in almost any type of fuel level responsive valve, and is not limited to the rollover valve application now described.

Figure 2:
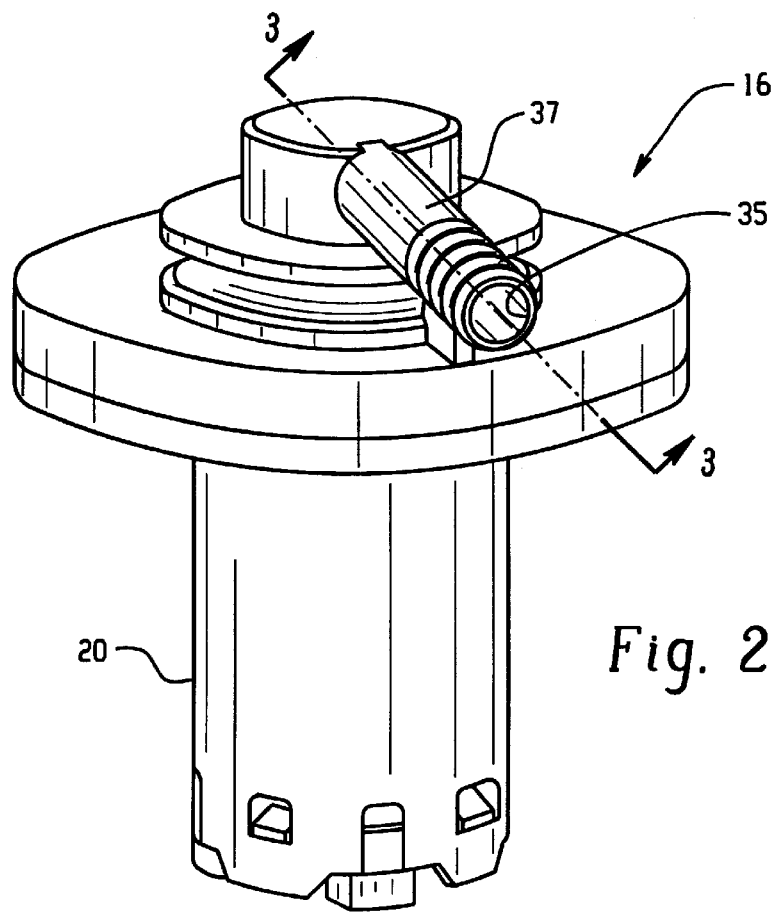
FIG. 2 is a perspective view of the rollover vent valve of FIG. 1.
Figure 3:
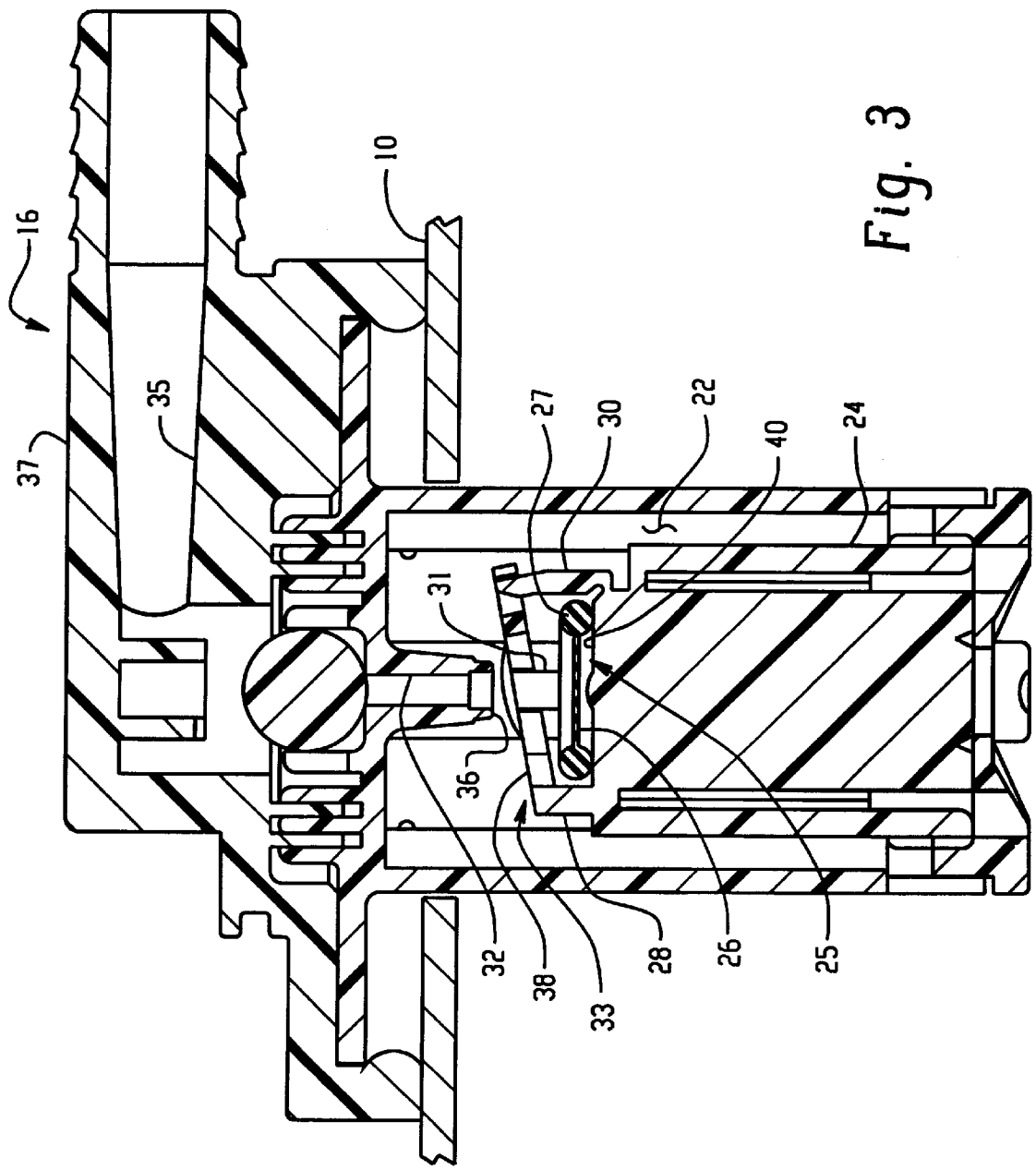
FIG. 3 is a cutaway or section view taken along section indicating lines 3—3 of FIG. 2, showing the valve fully open.

Referring next to FIGS. 2 and 3, the inventive valve 16 is illustrated in detail, generally comprising the valve closure and reopening structure at the top of a float mechanism and its relationship to a vapor venting outlet in the upper end of the valve where fuel vapor is vented to the vapor recovery apparatus outside the fuel tank. In particular, valve 16 includes a valve body 20 having a generally hollow cylinder made from a fuel-resistant plastic material, although the exact composition of valve body 20 is not critical to the present invention. Valve body 20 includes an interior float chamber 22 designed to receive a fuel level responsive float 24 in a sliding arrangement. Float chamber 22 typically includes at least one, and usually several lower fuel entry ports (not shown) and one or more higher fuel vapor entry ports (not shown) such that liquid fuel freely enters chamber 22 when the fuel level in the tank reaches valve 16, thereby forcing the float 24 upwardly toward vapor venting orifice or outlet 32 located in the upper end of the float chamber and having the lower end thereof forming a valve seat 36. Outlet 32 communicates with a passage 35 on the portion 37 of the valve external to tank 10, which portion 35 is adapted for connection to conduit or hose 17 connected to canister 14. The fuel vapor entry ports in the upper end of the valve body, usually in the form of radial windows (not shown) in the sidewall around chamber 22, admit fuel vapor to be vented through outlet 32 until the outlet is closed by a valve element on the float contacting valve seat 36.

Figure 6:
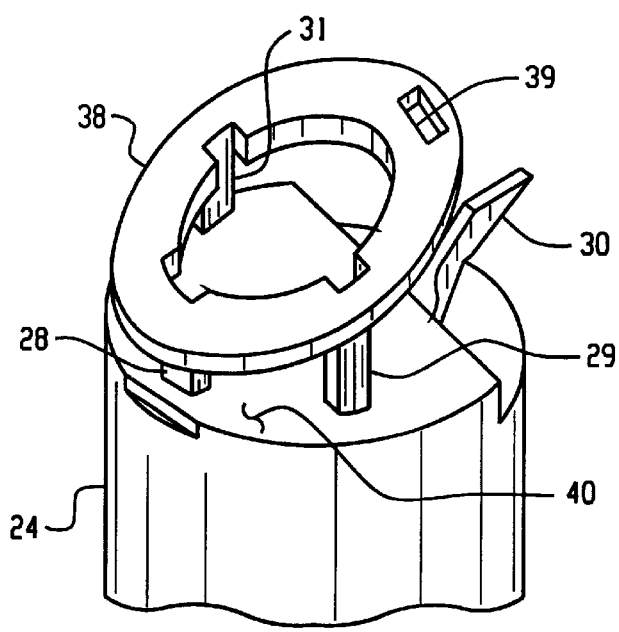

Float 24 carries a valve closure element indicated generally at 25 on its upper end, captured on the float at one end by flange ring 38 and posts 28, 29, 31 and hinged port 30, illustrated in FIG. 6 as an integral part of float 24 projecting from its upper surface and which forms a cage indicated generally at 33. The cage 33 thus comprises a flange or ring 38 supported by posts 28, 29, 31 and 30 which allow the valve element some limited up and down and side to side travel or lost motion relative to the float for a peelaway type reopening action described in further detail below.

Referring to FIG. 6 hinged post 30 is shown in the open position enabling the valve seal element 26 to be inserted in cage 33, prior to snap locking the end of post 30 into cutout 39 formed in flange ring 38.

Figure 4:
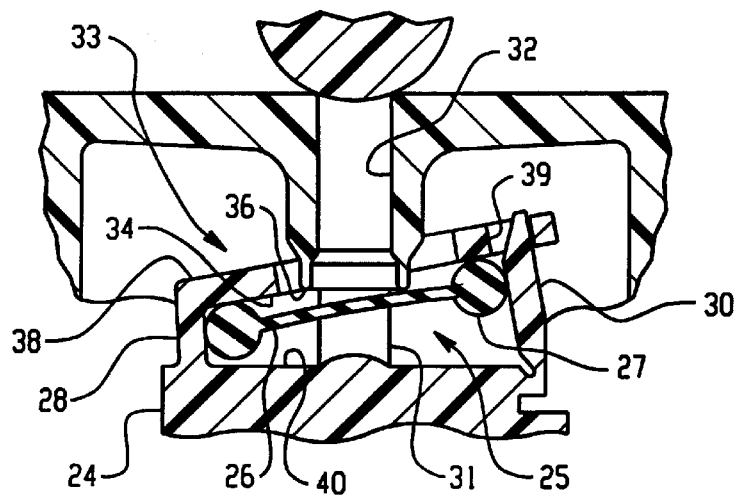
FIG. 4 is an enlarged view of a portion of FIG. 3 showing the initial peelaway stage when the seal between the valve element and the vent outlet is first broken.

Valve element 25 is shown in its valve closed position in FIG. 4, forced against vent seat 36 and outlet 32 and is shown in partially peeled open state. In this beginning to open position, valve element 25 is contacted at its rim by the undersurface of the flange or ring 38.

Figure 5:
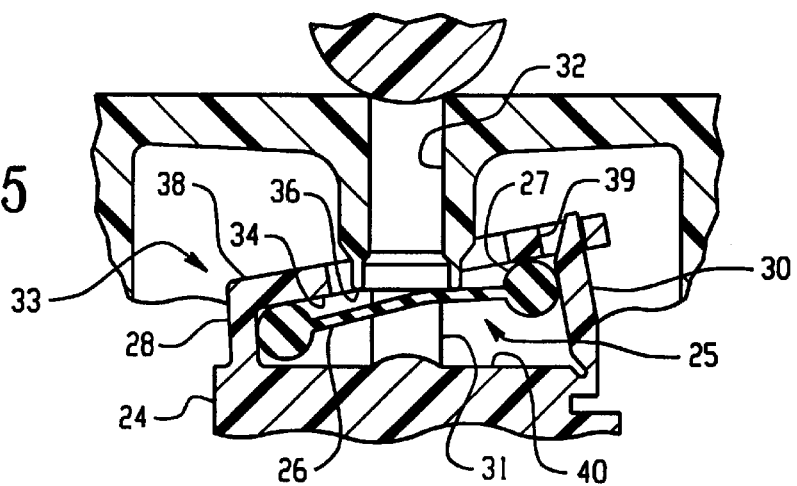
FIG. 5 is a view showing the valve element further opened from the position of FIG. 4; and, FIG. 6 is a perspective view of the top of the float with the cage opened for insertion of the valve member.

Referring to FIGS. 3, 4 and 5, in accordance with the present invention, valve element 25 comprises a soft, pliable, rubberlike seal element 26.

Valve closure element 25 is preferably a disk-shaped element with a stiffened, preferably, thickened edge 27, illustrated as an annular bead, surrounding a thin, pliable central webbing or diaphragm-like seal element portion 26. For purposes of illustration, the central webbing seal element portion 26 is preferably on the order of 0.015 inches (0.38 mm) in thickness, although it will be apparent to those skilled in the art that different thicknesses with different pliability characteristics may be used depending on the valve application. As shown in FIG. 4, central seal element portion 26 makes a closely-conforming seal with valve seat 36 of vent outlet 32 which is generally superior to the seal formed by rigid plastic valve elements. The thin, pliable nature of central seal element portion 26 provides what is known as a "low sealing force" seal with the vent outlet, which is generally desirable in most applications.

The pliable, reinforced rubber seal 26 is trapped for limited vertical and horizontal movement inside cage 33 which results in improved sealing and reopening action. It will be understood that when the fuel level begins to drop float 24 begins to descend in float chamber 22. Referring to FIG. 4, while the pliable rubber seal 26 remains closed on vent seat 36 of outlet 32 due to the pressure differential between the fuel tank and the canister, and the underside 34 of the flange 38 contacts the upper surface of bead rim 27 and has begun to "crack open" a portion of seal 26 from the vent port valve seat 36.

This initial cracking or peeling action breaks the seal between rubber disk 26 and vent outlet 32 to begin reducing the pressure differential across rubber seal 26.

Referring next to FIG. 5, float 24 has dropped further to bring the underside of actuator flange 38 lower to continue the peeling action and break any remaining contact between rubber seal 27 and vent outlet 32 by pulling it straight off the vent outlet. As shown in FIG. 5, the reinforced edge 27 on pliable rubber seal 26 serves to stiffen the overall rubber seal to pull it off the vent outlet in a manner similar to a rigid seal element for the final opening stages.

In FIG. 3, float 24 is shown as having descended far enough to pull valve element 25 completely free from the vent seat 36 of outlet 32, such that valve element 25 now drops back down to rest on the upper surface of the float, with internal rubber seal 26 dropping down inside paddle frame cage 33 to its ramp-centered lower position on upper surface 40 of float 24 shoulder 26*h*.

It will be apparent to those skilled in the art that various modifications may be made to the disclosed structure for different valve applications, without departing from the spirit and scope of my invention. For example, the size and shape of valve element 25 may vary depending on the vent outlet which it is intended to close. The invention is not to be limited by the foregoing exemplary illustrations, except as provided by the following claims.

What is claimed is:

1. A fuel level responsive valve adapted for use in a vehicle fuel tank to close vapor venting from the tank to a vapor recovery apparatus when the fuel level in the tank rises to a certain level, the valve comprising:

(a) a valve body having a float chamber and a vapor venting outlet at an upper end of the float chamber;

(b) a float in the float chamber, the float having a closed position near the vapor venting outlet when the fuel level rises, and an open position away from the vapor venting outlet when the fuel level drops;

(c) a valve element disposed for movement with and including means providing a lever type peelaway opening action to the valve element with respect to the venting outlet wherein the valve element comprises a resilient seal portion trapped on said float for limited vertical and horizontal movement and including a relatively stiff, peripheral portion.

2. A fuel level responsive valve adapted for use in a vehicle fuel tank to close vapor venting from the tank to a vapor recovery apparatus when the fuel level in the tank rises to a certain level, the valve comprising:

(a) a valve body having a float chamber and a vapor venting outlet at an upper end of the float chamber;

(b) a float in the float chamber, the float having a closed position near the vapor venting outlet when the fuel level rises, and an open position away from the vapor venting outlet when the fuel level drops; wherein, the valve element comprises a resilient rubber-like valve closure member having a relatively thin flexible central portion and a relatively stiff peripheral portion and said float includes structure operable to contact the peripheral portion of said valve element for effecting a peel-away action.

3. A float operated valve assembly for a fuel tank comprising:
   (a) a valve body having a float chamber and a vapor venting outlet port at an upper end of the float chamber;
   (b) a valve member disposed for movement with said float for closing said outlet port, said valve member having a relatively thin, flexible portion and a stiffened, marginal portion of substantially lesser flexibility than said flexible portion;
   (c) means operative for capturing said valve member on said float for limited lost motion movement with respect thereto, said means operative to contact said thickened marginal portion and to effect peelaway movement of said valve member from said venting outlet port upon dropping of said float.

4. The valve assembly defined in claim 3, wherein said valve member is formed of elastomeric material.

5. The valve assembly defined in claim 3, wherein said means attaching said valve member is formed integrally as one piece with said float.

6. The valve assembly defined in claim 3, wherein said means attaching said valve member is formed integrally as one piece with said float and includes a living hinge portion deformed to retain said valve member.

7. The valve assembly defined in claim 3, wherein said means attaching said valve member is formed integrally with said float and includes a cage portion deformed and snap-locked for retaining said valve member.

8. The valve assembly defined in claim 3, wherein said valve member flexible portion comprises a central region.

9. The valve assembly defined in claim 3, wherein said stiffened marginal portion comprises a thickened peripheral rim.

10. A method of closing a vapor vent port in a fuel tank in response to fuel level in the tank comprising:
    (a) disposing a valve body in said tank and forming a vapor vent port therein;
    (b) disposing a float for movement with respect to said port in response to changes in fuel level in the tank.
    (c) capturing a resilient valve member for limited lost motion movement on said float and stiffening marginal portions of said valve member; and,
    (d) closing said valve member on said port when the fuel level reaches a certain level and moving said marginal portions of said valve member and effecting a peelaway opening of said port when fuel level falls below said certain level.

11. The method defined in claim 10, wherein said step of capturing a valve member includes forming a cage integrally as one piece with said float.

12. The method defined in claim 10, wherein said step of stiffening the marginal portions of said valve member includes forming a thickened peripheral rim about said valve member.

13. The method defined in claim 10, wherein said step of capturing includes forming an integrally hinged portion as one piece on said float and deforming said hinged portion and retaining said valve member on said float.

14. The method defined in claim 10, wherein said step of stiffening marginal portions of said valve member includes forming said flexible portions and marginal portions integrally of elastomer.

* * * * *